United States Patent [19]

Kimura

[11] Patent Number: 5,134,503
[45] Date of Patent: Jul. 28, 1992

[54] IMAGE PROCESSING APPARATUS

[75] Inventor: Hideaki Kimura, Kanagawa, Japan

[73] Assignee: Fuji Photo Film Co., Ltd., Kanagawa, Japan

[21] Appl. No.: 554,753

[22] Filed: Jul. 19, 1990

[30] Foreign Application Priority Data

Jul. 21, 1989 [JP] Japan .................. 1-190180

[51] Int. Cl.$^5$ ............................................ H04N 1/40
[52] U.S. Cl. .................. 358/447; 358/448; 358/463
[58] Field of Search ............... 358/447, 448, 463, 445

[56] References Cited

U.S. PATENT DOCUMENTS

| | | | |
|---|---|---|---|
| 4,517,607 | 5/1985 | Ohkouchi et al. | 358/447 |
| 4,613,986 | 9/1986 | Ataman et al. | 358/447 |
| 4,670,793 | 6/1987 | Yamada et al. | 358/463 |
| 4,700,229 | 10/1987 | Herrmann et al. | 358/447 |
| 4,703,363 | 10/1987 | Kitamura | 358/448 |
| 4,941,190 | 7/1990 | Joyce | 358/447 |
| 4,965,679 | 12/1990 | Morton et al. | 358/447 |
| 4,969,051 | 9/1990 | Sesaki | 358/447 |
| 4,972,256 | 11/1990 | Hirosawa et al. | 358/447 |

Primary Examiner—Jin F. Ng
Assistant Examiner—Edward Lefkowitz
Attorney, Agent, or Firm—Sughrue, Mion, Zinn, Macpeak & Seas

[57] ABSTRACT

The image processing apparatus of the present invention determines the number of surrounding pixels to be averaged and their locations, determines a weighting coefficient based on the density and contrast levels of an input image data derived from a continuous tone image, and performs an averaging operation on the input image signal by performing a weighting operation using the averaged result of the surrounding pixels, the input image data, and the weighting coefficient. Therefore, the image processing apparatus of the present invention is capable of reducing the noise level over a wide range of image types, from shadow regions with high density, Further to highlight regions with low density, and images reproduced by this apparatus do not exhibit a deterioration of the sharpness of image boundaries in the high density regions, images characterized by a gradual change in the density level do not turn out having an unnatural quality.

18 Claims, 3 Drawing Sheets

F I G. 4a
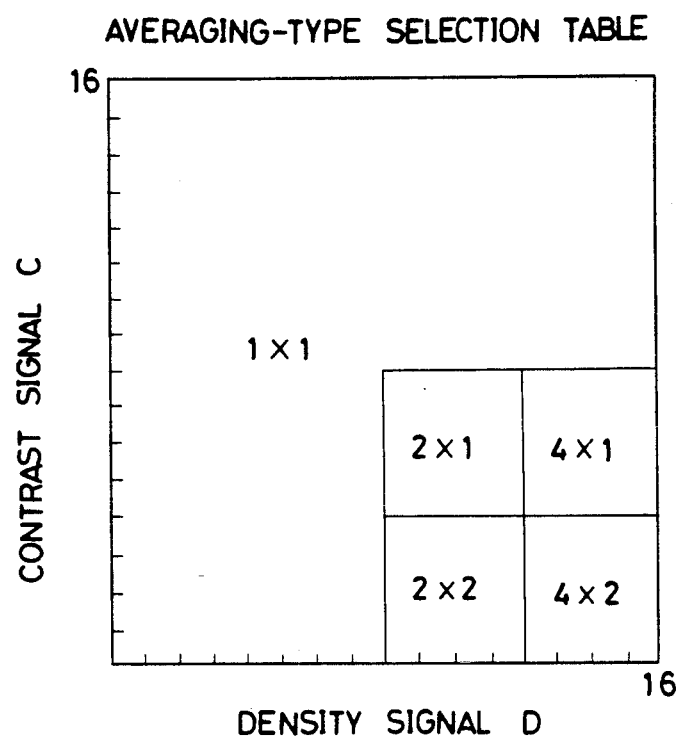
F I G. 4b
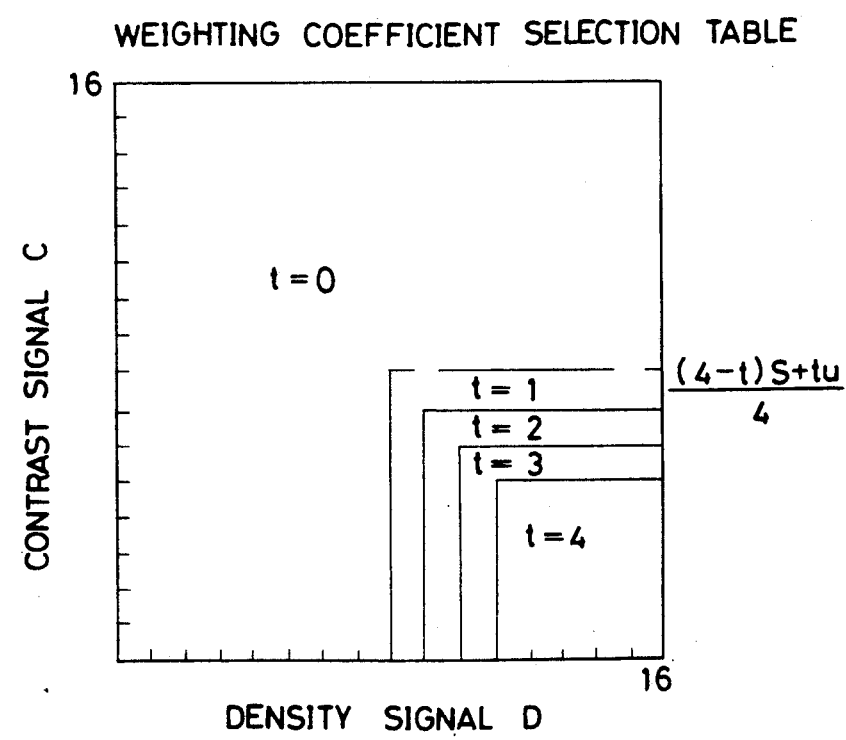

IMAGE PROCESSING APPARATUS

BACKGROUND OF THE INVENTION

1. Field of the Invention

The present invention relates to an image processing apparatus, and more particularly to an image processing apparatus that is capable of suitably reducing the noise in an image signal through the application of an averaging operation on the image signal based on the density and contrast data pertaining to the image signal, the image signal being obtained from a continuous tone image.

2. Description of the Related Art

When a continuous tone image is reproduced on a photographic film, or the like, after transforming the continuous tone image to an electrical signal by means of a solid-state image sensing device such as a CCD (Charge Coupled Device) image sensor, the reproduced image may become corrupted by noise owing to the operating properties of the solid-state image sensing device. When the image signal is corrupted by noise, the reproduced image will appear rough or uneven, making the reproduced image not fit for viewing. Particularly, since human vision exhibits an approximately logarithmic characteristic with respect to brightness, even when the shadow areas in the high density regions and the highlight areas in the low density regions in the continuous tone image are corrupted by the same amount of noise, a person will perceive a higher noise level in the shadow areas in the high density regions, and thus experience a substantial degradation of the quality of the reproduced image. A known method for reducing the visible noise level in the reproduced image is an image processing scheme in which the image signal, after having been transformed into an electrical signal, is subjected to an averaging operation.

When density levels of the whole continuous tone image are averaged and the result of the averaging process is used to generate an output, a reduction of the visible noise level is achieved. However, this also leads to a reduction of the resolution in the highlight areas of the reproduced image. While human vision exhibits a characteristic of low spatial resolution with respect to the shadow areas in the continuous tone image, a high spatial resolution characteristic is exhibited with respect to highlight areas. In effect, while the visible noise level in the shadow areas may be suitably reduced, the resolution in the highlight areas deteriorates.

Accordingly, in an apparatus disclosed in U.S. Pat. No. 4,868,671 the above-mentioned averaging operation on the image signal is performed with respect to the shadow areas only. In other words, in this prior art, each of the image signals derived from the continuous tone image is compared with a predetermined reference value, which is chosen to lie between values derived for the shadow and highlight areas, and the apparatus is designed to perform the averaging operation on the image signals based on the result of this comparison. In this case, an image having no appreciable noise in the shadow areas is obtained from the averaged image signals. At the same time, there is no reduction in the resolution in the highlight areas since the averaging operation was not applied in these areas.

However, in the image processing apparatus disclosed in U.S. Pat. No. 4,868,621 mentioned above, in the shadow areas with high density levels, the process of averaging the image signals and the surrounding pixels causes the edges in the high-density regions of the image to become smoothed, thus resulting in a deterioration of the sharpness of the image.

Also, in the above-mentioned apparatus, the decision as to whether or not the image signal should be processed for averaging is made based on the comparison of the image signal with one threshold value or several threshold values. As a consequence, the reproduced image will exhibit abrupt changes in the smoothness or sharpness of the image in regions where the image is supposed to change gradually from shadow to highlight. In cases where the image has gradual changes in density, a problem arises in that the reproduced image will have an unnatural quality in regions with density levels close to the aforementioned threshold value or values.

BRIEF SUMMARY OF THE INVENTION

The object of the present invention is to provide an image processing apparatus that is capable of solving the problems encountered in the prior art through a method described in the following: In the averaging operation performed on the image signal derived from the continuous tone signal, the surrounding pixels to be included in the averaging process and a weighting coefficient are determined based on the density and contrast levels of the input image data. By applying a weighting operation according to an equation using the average data (obtained using the current image data and the surrounding pixels), the input image data, and the determined weighting coefficient, the noise can be satisfactorily reduced over a wide range of regions, from shadow areas with high density to highlight areas with low density, specifically, there is no resultant deterioration of the sharpness of the edges in high density regions and images with gradually changing densities do not turn out having an unnatural quality.

In order to achieve the object mentioned above, the present invention provides an image processing apparatus that performs an averaging operation of input image data of a current pixel and a plurality of input image data of pixels surrounding the current pixel which are derived from a continuous tone image, and outputs a corrected image data that are reduced in noise level; the image processing apparatus comprising:

an averaging means for applying an averaging operation on the input image data of the current pixel and the image data of the surrounding pixels to take average data;

an averaging-type determining means for determining the surrounding pixels to be included in the averaging operation, based on density and contrast levels of the input image data;

a weighting coefficient determining means for determining at least one weighting coefficient based on the density and contrast levels of the input image data, and a weighting means for performing a weighting operation on the average data and the input image data with the weighting coefficient to take the corrected image data.

In a preferred embodiment of the present invention, the weighting means is a weight-and-add means.

In another preferred embodiment of the present invention, the averaging-type determining means determines the number of pixels and the corresponding pixels to be averaged, based on the density and contrast levels.

In still another preferred embodiment of the present invention, the averaging-type determining means includes a average-type selection table which has previously stored the number of pixels and the corresponding pixels based on the density and contrast levels.

In a further preferred embodiment of the present invention, the weighting coefficient determining means includes a weighting coefficient selection table which has previously stored the weighting coefficient based on the density and contrast levels.

In a still further preferred embodiment of the present invention, the averaging-type determining means is one that selects a previously determined average data obtained through an averaging process that includes a set of surrounding pixels.

BRIEF DESCRIPTION OF THE DRAWINGS

FIG. 4a and FIG. 4b, respectively, show the averaging-type selection table and the weighting coefficient selection table that are stored in a look-up table employed in the present invention.

DETAILED DESCRIPTION OF THE PREFERRED EMBODIMENTS

The image processing apparatus related to the present invention will now be described in detail using a suitable embodiment as an example, and using the attached illustrations for reference.

Figure 1:
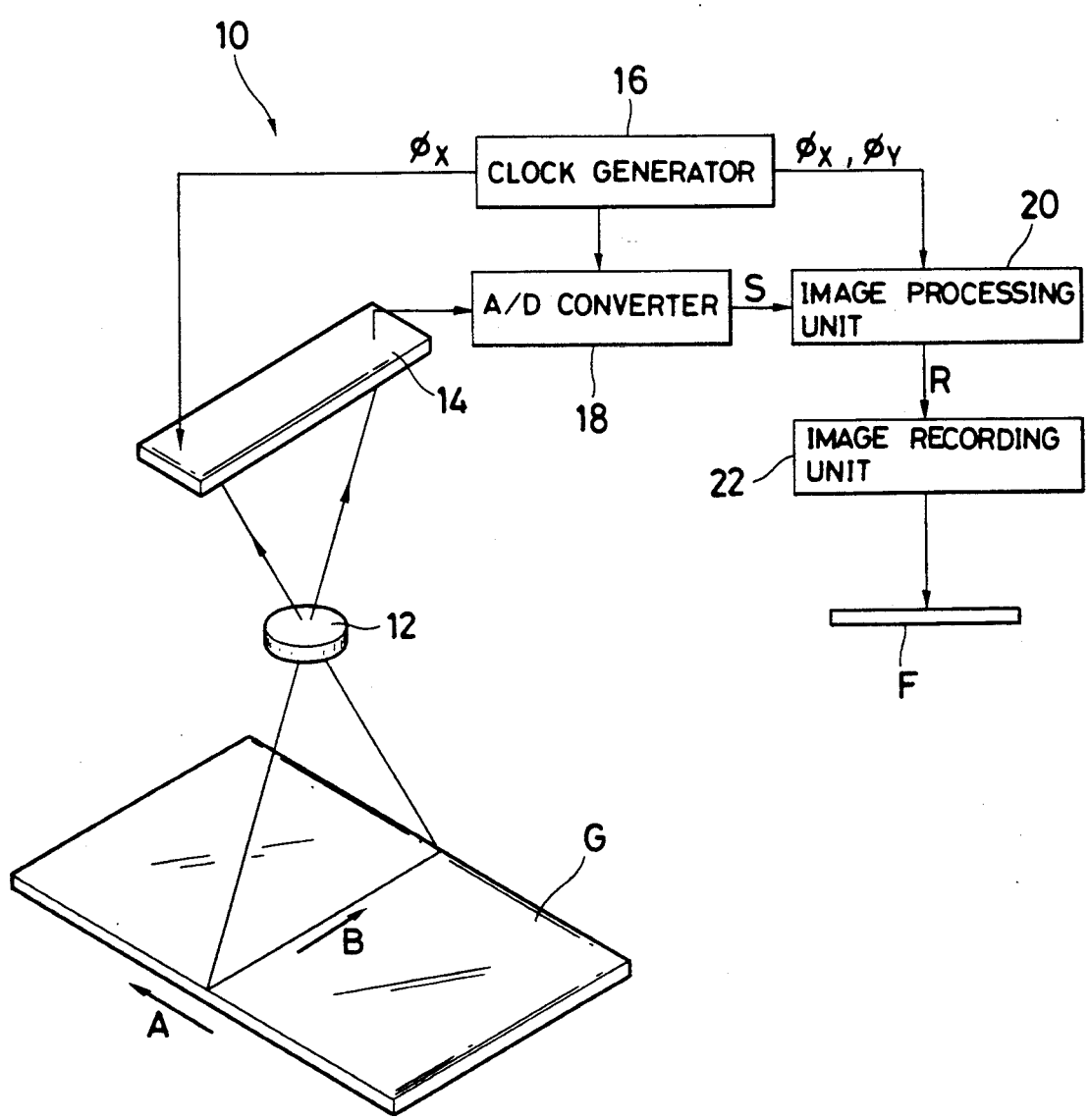
FIG. 1 is a structural diagram of a typical image scanning and recording system employing an image processing apparatus related to the present invention.

The part indicated by the reference number 10 in FIG. 1 corresponds to an image scanning and recording system that employs the image processing apparatus related to the present invention. In this image scanning and recording system 10, the continuous tone image from an original G (i.e., document) is transformed into an electrical signal and then reproduced on a photographic film F in the form of a halftone dot image.

In other words, the structure of the image processing apparatus is such that the original G is transported by the action of a transporting means (not shown in the illustration) in an auxiliary scanning direction indicated by the arrow A. At the same time, the continuous tone image on the original G is subjected to a main scanning operation, in the direction indicated by the arrow B, by a CCD 14, serving as a photoelectric transforming means, via a beam-condensing optical system 12. After undergoing photoelectric transformation and a compensation operation in analog form, such as gain compensation and the like, the continuous tone image is converted to a digital signal by an A/D converter 18 to obtain the image signal S, based on the main scanning clock signal $\phi_x$ from a clock generator 16. The image signal S is thereafter sent to an image processing unit 20 comprising the image processing apparatus of the present invention. The image processing unit 20 performs shade and darkness compensations of the CCD on the aforementioned image signal S based on the main scanning clock signal $\phi_x$ and the auxiliary scanning clock signal $\phi_y$ from the clock generator 16. Thereafter, various image processing operation such as logarithmic transformation, tone transformation, size transformation, smoothing, sharpness processing, halftone separation processing, and the like, are performed, and a binary dot image signal R is produced and sent to an image recording unit 22. The image recording unit 22 transforms the aforementioned dot image signal R into an optical signal such as a laser beam, leads the signal onto a photographic film F, and records the halftone dot image thereon.

Figure 2:
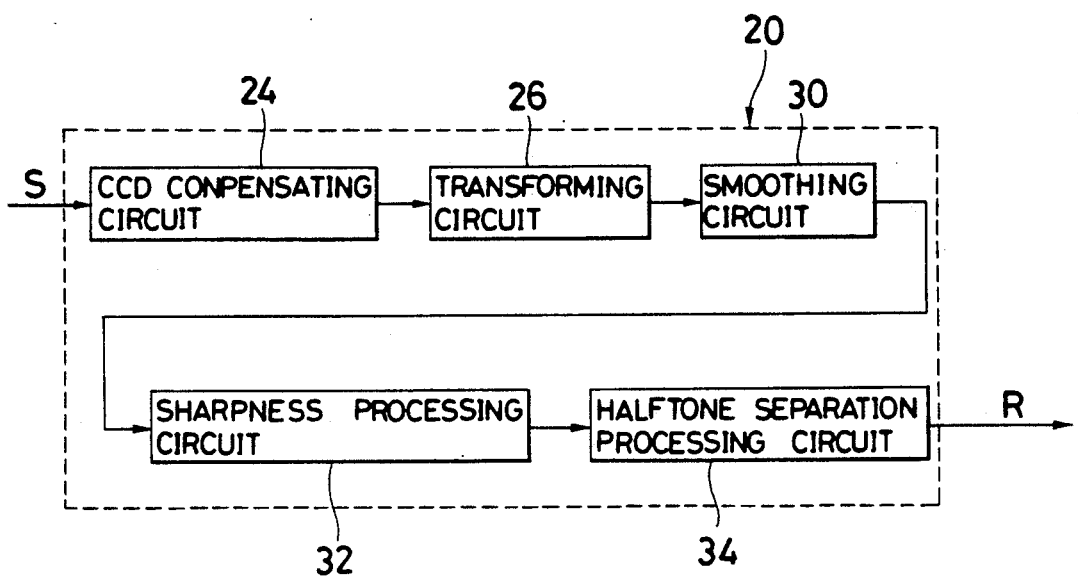
FIG. 2 is a block diagram of an embodiment of the image processing unit shown in FIG. 1.

FIG. 2 is an illustration of the structure of the image processing apparatus 20 shown in FIG. 1. Here, the image processing unit 20 is equipped with a CCD compensating circuit 24, a transforming circuit 26, a smoothing ("unsharp" processing) circuit 30, a sharpness processing circuit 32, and a halftone separation processing circuit 34.

The CCD compensating circuit 24 performs a shading compensation to compensate for the fluctuations in the intensity of the received light (including fluctuations in the illumination) caused by the wide variation of each of the pixels of the CCD 14, a solid-state image-sensing device. Likewise, the CCD compensating circuit 24 performs a darkness compensation to compensate for the fluctuation in the bases of each of the pixels (such fluctuation exists even when there is no incident optical signal), making the received light signals corresponding to each of the pixels have uniform bases. For example, it assigns the same image data (image signals) to all document image signals having the same image density levels. These shading and darkness compensations may be carried out on the analog data, that is, before the received optical signal from the CCD 14 is A/D transformed by the A/D converter 18. In such a case, the CCD compensating circuit is placed "upstream" with respect to the direction of signal transmission, that is, before the A/D converter 18. Also, the CCD compensating circuit 24 may be placed after the logarithmic transforming circuit, which will be described later, so that CCD compensation is performed after logarithmic transformation.

The transforming circuit 26 serves to transform the image signal into a signal suitable for image recording, and comprises a logarithmic transforming circuit that performs a logarithmic transformation of the image signal, a tone transforming circuit that transforms the image signal into another image signal corresponding to an appropriate tone characteristic (amount of exposure vs. density level characteristic), and a size transforming circuit that transforms the image signal into another image signal corresponding to the pixel density detected along the main scanning direction.

The sharpness processing circuit 32 performs sharpness processing to enhance the sharpness of the contours such as edges in the image. For example, it subtracts a constant multiple of the smoothed image data, that is, a smoothed version of the original image data from the original image data, and applies "unsharp" masking of the smoothed image data to increase the sharpness of the image and consequently enhance the contour edges.

The halftone separation processing circuit 34 generates a dot image signal R from the image density signal. The dot image signal is used to modulate the area of the image density according to a required angle and number of lines. This dot image signal R is thereafter sent to the image recording unit 22.

The CCD compensating circuit 24, transforming circuit 26, sharpness processing circuit 32, and the halftone separation processing circuit 34 mentioned above can be realized with known conventional circuits.

The smoothing circuit 30 represents the most distinctive feature of the present invention, and is one of the constituent parts of the image processing apparatus of the present invention. The smoothing circuit 30 applies an averaging operation on the input image data of the current pixel and image data of its surrounding pixels to effect a reduction of the noise in the image data signal, and outputs a compensated image data. A concrete embodiment of the smoothing circuit 30 is shown in FIG. 3.

Figure 3:
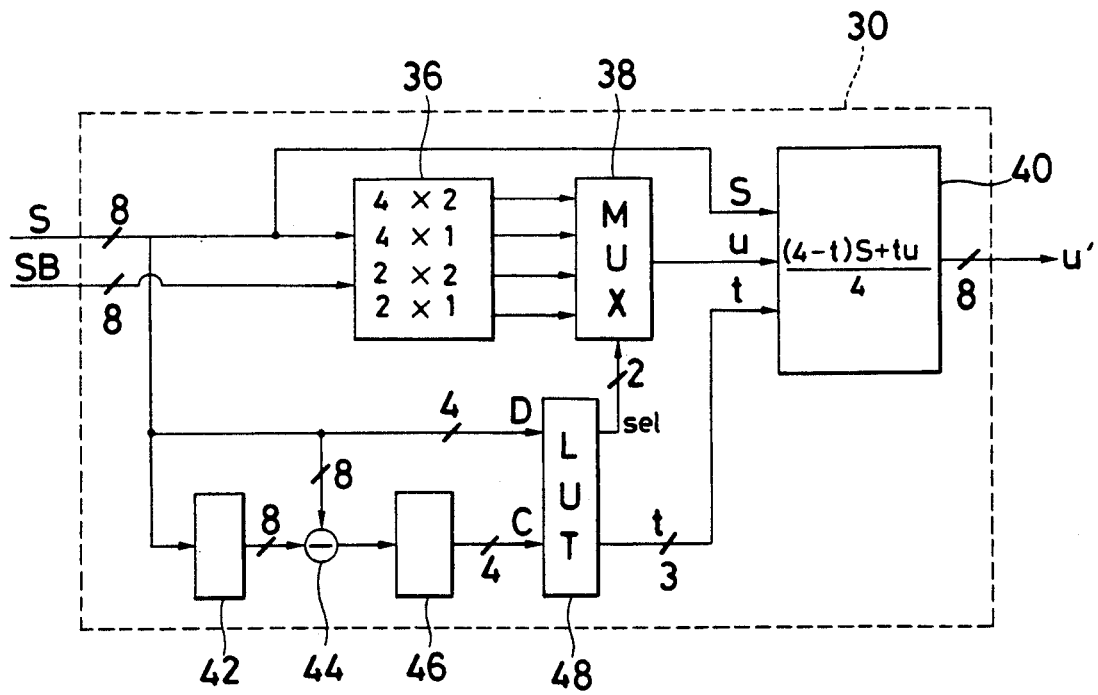
FIG. 3 is a block diagram of an embodiment of the smoothing circuit shown in FIG. 2.

As shown in FIG. 3, the smoothing circuit 30 comprises an averaging circuit 36, a multiplexer (MUX) 38, a synthesis circuit 40, a register 42, a subtracting device 44, a limiter 46, and a look-up table (LUT) 48.

The averaging circuit 36 makes up the averaging means of the present invention. It receives the pixel signal S, from the input image data in the line currently being scanned, and the pixel signal SB corresponding to the previously scanned line, and performs an averaging operation on these pixel data together with a predetermined number of surrounding pixels which have been selected for the averaging operation by the averaging-type determining means of the present invention. A number of sets of surrounding pixels and the number of pixels to be averaged are determined beforehand based on the pixel signals S and SB, and each set of pixels is averaged to obtain a mean value corresponding to each set. For example, the averaging circuit 36 operates by finding the average data u ($u_1$ to $u_4$) (that is, the "unsharp" signals corresponding to the pixel currently being processed) comprising: The mean value corresponding to 8 pixels (4×2), that is, 4 pixels from the line currently being scanned and includes the pixel currently being processed, 4 pixels from the previously scanned line, these pixels corresponding in position (i.e., pixel numbers) to the pixels from the line currently being scanned; the mean value corresponding to 4 pixels (4×1) from the line currently being scanned; the mean value corresponding to 4 pixels (2×2), that is, 2 pixels each from the line currently being scanned and the line scanned previously; and the mean value corresponding to 2 pixels (2×1) from the line currently being scanned.

With regard to the selection of the surrounding pixels to be averaged with respect to the line currently being scanned, an appropriate number of these aforementioned surrounding pixels may be appropriately selected from the continuous series of pixels before and after the pixel currently being processed. Also, the set of surrounding pixels to be averaged is not limited to the pixels with the same pixel numbers (i.e., position) on the 2 scanning lines, that is, the line to be scanned and the immediately preceding scanning line, but may be suitably selected, with the appropriate number of pixels, from the line to be scanned and the immediately following scanning line, or from a line or a number of lines before or after the line to be scanned.

The number of pixels to be averaged is not limited to the aforementioned 8, 4, or 2 pixels described above, but may also be set to 9 pixels, that is, the current pixel and its surrounding adjacent 8 pixels (3×3 pixels, corresponding to 3 pixels each from the current line and the lines before and after the current line). Further, the number of pixels may be set to 5 pixels, or 3 pixels, and the way (combination) these corresponding number of pixels are chosen can be done arbitrarily.

The averaging operation performed by the averaging circuit 36 is not particularly limited to any type, and the average value obtained may be of any type which may be the simple mean, that is, the arithmetic mean. For example, letting N be the number of pixels to be averaged, and $S_k$ be the pixel signals, the arithmetic mean is found by the following equation:

$$u = \frac{1}{N} \sum_{k=1}^{n} S_k$$

The average value may also be the root-mean-square value given by:

$$u = \frac{1}{N} \sqrt{\sum_{k=1}^{n} S_k^2}$$

From the point of view of the simplicity of the structure of the circuit, the simple mean is preferred.

The MUX 38 serves as a data selector. Based on the select signal from the LUT 48, the MUX 38 selects the prescribed average data u from among the number of average data obtained by the averaging circuit 36 and sends it to the synthesis circuit 40.

The synthesis circuit 40 makes up the weighting means of the present invention. The synthesis circuit 40 performs a mathematical operation involving the input image data S, the average data u, and the weighting coefficient t (0 to 4) determined from the LUT 48, to obtain the quantity u' given, for example, by the following equation:

$$u' = \frac{(4-t)u + tS}{4} = u - \frac{t}{4}(u - S)$$
$$= S - (1 - (t/4))(S - u)$$

The quantity u' is thereafter used as input for the next operation (sharpness processing).

The weighting means of the present invention is not limited to one that operates according to the weight-and-add weighting equation stated above, but may involve other weighting operations that perform the necessary weighting requirements. For example, the following weighting function may be used:

$$u' = u + \sum_{i=1}^{n} a_i(u - S)^i$$

where $a_i$ (i=1, ..., n) are the weighting coefficients.

The synthesis circuit 40 may be constructed from any known operational circuits as long as it is capable of performing the weighting operations mentioned above.

The register 42 is used to record pixel signals of the pixels surrounding the current pixel, for example, the pixel signal $S_{i-1}$ of the immediately preceding pixel, while the subtracting device 44 is used to obtain the difference signal, that is, the density level difference $S_{i-1} - S_i$ between the previous pixel signal $S_{i-1}$ recorded in the register 42 and the pixel signal $S_i$ of the current pixel. Also, the limiter 46 operates by taking the absolute value of the density level difference $S_i - 1 - S_i$ generated by the subtracting device 44 and performing a normalization of the absolute value. Thereafter, the limiter 46 compares the normalized value with a predetermined maximum threshold and sets the value to the maximum threshold whenever the normalized value exceeds the threshold.

The register 42, the subtracting device 44, and the limiter 46 make up the means for obtaining the contrast signal C of the current pixel. It is noted that when the contrast signal C is represented by the same number of bits as the image data, the limiting operation by the limiter 46 becomes unnecessary.

In the present invention, the LUT 48 makes up the averaging-type determining means that determines the number of pixels and the corresponding pixels to be averaged, and the weighting coefficient determining means that determines the weighting coefficient used in the weighting operation, both processes being based on the density level and contrast of the input image data. Based on the density signal D and the contrast signal C of the input image data, the LUT 48 retrieves the appropriate number of pixels to be averaged from a averaging-type selection table, which has been stored with these beforehand, and sends a select signal Sel, corresponding to the pattern of the pixels to be averaged, to the MUX 38. At the same time, the LUT 48 retrieves the appropriate weighting coefficient t from a weighting coefficient selection table, which has been stored with these beforehand, and sends the weighting coefficient signal to the synthesis circuit 40.

FIG. 4a shows an example of an averaging-type selection table which illustrates the selection of the type of averaging to be performed depending on the values of the density signal D and the contrast signal C of the input image data. FIG. 4b also shows a corresponding example of a weighting coefficient selection table.

As shown in FIG. 4a, the averaging-type selection table used in the present invention indicates that in regions of high density and low contrast, where a rough and uneven quality of the reproduced image due to noise is significant, the input image data is averaged, and as the contrast level decreases and the density level increases, the number of pixels that are averaged increases. Likewise, as shown in FIG. 4b, in the weighting coefficient selection table of the present invention, as a point moves closer to a region of higher density and lower contrast, a region where a rough and uneven quality of the reproduced image due to noise is significant, the weighting coefficient t of the average data u becomes larger, while the weight on the original image signal S, which was not averaged, becomes smaller.

It is important to express the density data D in terms of the overall density even at low resolution. The contrast data C is important at low contrast levels. Therefore, in the present invention, for example, when the image data is represented by 8 bits, the density data D and the contrast data C may both be represented by 8 bits, but another way of representing these two data is to let the 4 most significant bits represent the density data D, and, by means of the limiter 46, let the 4 least significant bits represent the contrast data C. As a result of this representation, the averaging-type selection table and the weighting coefficient selection table can be made compact as shown in FIG. 4a and FIG. 4b, respectively, allowing for the simple selection of the averaging-type select signal Sel and the weighting coefficient t. In other words, the 4 bits allocated individually for the density data D and the contrast data C will correspond to 16 levels each to make up a 16×16 table of 256 points, each point being assigned a corresponding select signal Sel in the averaging-type selection table and a corresponding weighting coefficient t in the weighting coefficient selection table.

Also, in the example shown in FIG. 3, the averaging-type selection table and the weighting coefficient selection table are both stored in the same LUT 48 and the select signal Sel and the coefficient t are both read from the same look-up table. This, however, may not always be the case, and the apparatus may be configured to have two exclusive look-up tables from which the select signal Sel and the coefficient t may be separately obtained.

Further, the LUT 48 may be constructed as mentioned above, but it is by no means limited to the ones shown in FIG. 4a and FIG. 4b. Also, the density data D and the contrast data C are not limited to the ones mentioned above, but they may be appropriately determined according to the image data to be processed, the data required for the desired reproduced image, and the averaging method employed.

The image scanner employing the image processing apparatus of the present invention is basically constructed in the manner described above. The operation of this image scanner is described below.

First, as shown in FIG. 1, the original G, which is being transported in the auxiliary scanning direction indicated by the arrow A, is scanned by the CCD 14 in the main scanning direction indicated by the arrow B, and the continuous tone image on the original G is transformed into an electrical signal by means of the beam-condensing optical system 12. Then, the continuous tone image, after being transformed into an electrical signal, is converted into a digital signal by means of the A/D converter 18, based on the main scanning clock $\phi_x$ from the clock generating circuit 16, and thus obtaining the image signal S. This image signal S is sent to the image processing unit 20, and, as shown in FIG. 2, is processed for shading compensation and darkness compensation in the CCD compensating circuit 24, and various transformations like logarithmic transformation, tone transformation, and size transformation in the transforming circuit 26. After going through all these processes, the resulting signal is sent to the smoothing circuit 30 shown in FIG. 3.

In the smoothing circuit 30, the 8-bit input image data signal S is sent as input to the averaging circuit 36, and sent, in turn, synthesis circuit 40, register 42, subtracting device 44, and the LUT 48. In the averaging circuit 36, 4 types of average data u ($u_1$ to $u_4$) are obtained from the signal S and the image data signal SB from the immediately preceding scanning line. The average data $u_1$ to $u_4$ are derived from data as follows: 4 pixels×2 scanning lines, 4 pixels×1 line, 2 pixels×2 lines, and 2 pixels×1 line. The data $u_1$ to $u_4$ are sent to the MUX 38. The image data, from the pixel immediately preceding the current pixel and stored in the register 42, is transmitted to the subtracting device 44. In the subtracting device 44, the difference between this transmitted image data and the image data in the current pixel is obtained. The limiter 46 takes the absolute value of this difference and limits it accordingly and outputs the contrast data C corresponding to the 4 least significant bits. On the other hand, the original image data S used as a direct input is set as the density signal D corresponding to the 4 most significant bits. This density signal D is input to the LUT 48, together with the above-mentioned contrast signal C.

The LUT 48 includes the averaging-type selection table and the weighting coefficient selection table similar to the ones shown in FIG. 4a and FIG. 4b, respectively. In the LUT 48, the number of pixels and the corresponding pixels (the image data) that are to be averaged and the weighting coefficient t are determined based on the density signal D and contrast signal C. In other words, the type of averaging to be performed, that is, 4×2, 4×1, 2×2, or 2×1, is selected, and the corresponding select signal Sel is determined. The select signal Sel is then sent to the MUX 38 while the coefficient t is sent to the synthesis circuit 40.

In the MUX 38, one of the average data, $u_1$, $u_2$, $u_3$, or $u_4$, is selected based on the select signal Sel from the LUT 48, and is transmitted to the synthesis circuit 40 as the average data u.

In the synthesis circuit 40, the following 8-bit smoothed signal u' is computed and obtained using the average data u, the direct-input original image data S, and the weighting coefficient t:

$$u' = \frac{(4 - t)S + tu}{4}$$

Since a considerable number of pixels were used in obtaining the average data u and the weighting coefficient t is large with respect to the shadow region characterized by high density and low contrast, the smoothed signal u' obtained in the manner above is sufficiently averaged together with the large number of surrounding pixels, resulting in a sufficient reduction of the noise. Consequently, the reproduced image, that has been recorded in terms of the signal u', will result in a high-quality image without any roughness and unevenness in the shadow regions.

Also, in regions of low density and/or high contrast, as in highlight regions, averaging is not performed, and, instead, the reproduced image is obtained using the original image data S. Thus, there is no resultant reduction in the image resolution due to smoothing and no deterioration of the sharpness of the edges in the highlight regions, and a highly resolved and sharp image is obtained.

Also, with respect to intermediate regions between high density-low contrast and low density-high contrast regions, the number of pixels to be averaged and the weighting coefficient t that is multiplied with the average data u are gradually decreased, and the smoothed data u' is obtained using these decreased quantities. Thus, the reproduced image obtained using this signal u' is reduced in noise but with the resolution intact, and the edges in the image emphasized. Since the degree of smoothing in the regions between shadow regions and contrast regions decreases gradually, a reproduced image without an unnatural quality is obtained.

After being transmitted by the smoothing circuit 30 to the sharpness processing circuit 32 and enhanced in the boundaries and edges, the smoothed signal u' described above is transformed into a pulse-width modulated signal by means of the halftone separation processing circuit 34 that is used for printing. The pulse width is proportional to the area of the points (dots) which are obtained optimally and at high resolution based on the image density. The pulse-width modulated signal transmitted to the image recording unit 22 as a dot image signal R.

Thereafter, in the image recording unit 22, a dot image corresponding to the dot image signal R is formed on the photographic film F.

The dot image reproduced on the photographic film, and obtained in the manner described above, does not have a rough and uneven density in the high density regions, has high resolution and high degree of sharpness in the low density regions, and, since the degree of smoothing changes gradually in the intermediate regions according to the density and contrast levels, the change in the resolution and sharpness in regions of the image characterized by a change from a high density to a low density appears natural, and the visible noise level is also reduced.

An appropriate embodiment of the present invention has thus been described above; however, the present invention is by no means limited to the described embodiment. Needless to say, the present invention may be designed and modified in various ways without departing from its spirit and scope.

As described above, according to the present invention, the number of pixels and the appropriate surrounding pixels to be smoothed are determined based on the density and contrast levels of the input image data, thereafter, smoothing is applied, the extent of such smoothing being great in regions of high density and low contrast to reduce the visible noise level. Then, as the processing area moves into a region of low density and high contrast, the extent of smoothing is gradually reduced. By this operation, a reproduced image, without roughness and unevenness in the high density regions and without deterioration of the resolution and sharpness in the low density-high contrast regions, can be obtained. Further, as the process of smoothing is carried naturally as the image changes from a high density region to a low density region, an image signal that does not give any unnatural character to the reproduced image can be obtained.

Therefore, the image signal that has been processed according to the image processing technique of the present invention is one in which deterioration of the sharpness is suppressed and the noise level is sufficiently reduced, and thus can be suitably used in the reproduction of pictures used in printing, wherein a high-resolution dot image generation is important and high-quality images are required.

What is claimed is:

1. An image processing apparatus that performs an averaging operation of input image data of a current pixel and a plurality of input image data of pixels surrounding the current pixel which are derived from a continuous tone image, and outputs corrected image data that are reduced in noise level, said image processing apparatus comprising:

an averaging means for applying an averaging operation on said input image data of the current pixel and said input image data of the surrounding pixels to take an average data;

an averaging-type determining means for determining the surrounding pixels to be included in the averaging operation, based on density and contrast levels of the input image data of the current pixel;

a weighting coefficient determining means for determining at least one weighting coefficient based on the density and contrast levels of the input image data of the current pixel; and a weighting means for performing a weighting operation on said average data and the input image data of the current pixel with the weighting coefficient to take the corrected image data.

2. An image processing apparatus according to claim 1 wherein said weighting means is a weight-and-add means.

3. An image processing apparatus according to claim 1 wherein said averaging-type determining means determines the number of pixels and the corresponding pixels to be averaged, based on the density and contrast levels.

4. An image processing apparatus according to claim 3 wherein said averaging-type determining means includes an averaging-type selection table which has previously stored the number of pixels and the corresponding pixels based on the density and contrast levels.

5. An image processing apparatus according to claim 1 wherein said weighting coefficient determining means includes a weighting coefficient selection table which has previously stored the weighting coefficient based on the density and contrast levels.

6. An image processing apparatus according to claim 1 wherein said averaging-type determining means is one that selects previously determined average data obtained through an averaging process that includes a predetermined set of surrounding pixels.

7. A method for producing corrected image data that are reduced in noise level, comprising the steps of:
 (a) receiving input image data of a scanning line containing a current pixel and a previous pixel and input image data of at least one scanning line other than the scanning line containing the current pixel;
 (b) producing a density signal from the data of the current pixel;
 (c) producing a contrast signal based on the data of the current pixel and the previous pixel;
 (d) selecting at least one weighting coefficient based on the density signal and the contrast signal;
 (e) determining a number of surrounding pixels to be averaged based on the density signal and the contrast signal; and
 (f) averaging the data of the current pixel with the data of the surrounding pixels determined in step (e) in accordance with the weighting coefficient.

8. A method according to claim 7 wherein the other scanning lines correspond to a previously scanned line.

9. A method according to claim 7 wherein step (e) comprises selecting from a number of predetermined sets of surrounding pixels.

10. A method according to claim 7 wherein said determining step (e) operates such that when the level of the contrast signal decreases and the level of the density signal increases, the number of surrounding pixels averaged increases.

11. A method according to claim 10 wherein said selecting step (d) selects a weighting coefficient for the current pixel, and operates such that when the level of the contrast signal decreases and the level of the density signal increases, the weighting coefficient for the current pixel decreases.

12. A method according to claim 7 wherein said selecting step (d) selects a weighting coefficient for the current pixel, and operates such that when the level of the contrast signal decreases and the level of the density signal increases, the weighting coefficient for the current pixel decreases.

13. An apparatus for producing corrected image data that are reduced in noise level, comprising:

an input unit for receiving input image data of a scanning line containing a current pixel and a previous pixel, and input image data of at least one scanning lines other than the scanning line containing the current pixel;

a density signal producing circuit, operatively connected to said input unit, for producing a density signal from the data of the current pixel;

a contrast signal producing circuit, operatively connected to said density signal producing circuit, for producing a contrast signal based on the data of the current pixel and the previous pixel;

a look-up table unit, operatively connected to said density signal producing circuit and said contrast signal producing circuit, for producing a weighting coefficient in accordance with the density signal and the contrast signal, and for producing a value representing a number of surrounding pixels to be averaged; and an averaging unit, operatively connected to said input unit and said look-up table unit, for averaging the current pixel with the number of surrounding pixels to be averaged in accordance with the weighting coefficient.

14. An apparatus according to claim 13 wherein said look-up table unit comprises:
 a first look-up table containing a plurality of weighting coefficients arranged in accordance with the density signal and the contrast signal; and
 a second look-up table containing values representing a number of surrounding pixels to be averaged, the values being arranged in accordance with the density signal and the contrast signal.

15. An apparatus according to claim 13 wherein said averaging unit comprises:
 an averaging circuit for averaging the number of surrounding pixels to be averaged to produce an average quantity; and
 a synthesis circuit for performing a weighted averaging operation based on the current pixel, the average quantity and the weighting coefficient to produce a weighted average quantity as a corrected pixel of the corrected image data.

16. A method according to claim 13 wherein said look-up table unit operates such that when the level of the contrast signal decreases and the level of the density signal increases, the number of surrounding pixels averaged increases.

17. A method according to claim 16 wherein said look-up table unit selects the weighting coefficient for the current pixel, and operates such that when the level of the contrast signal decreases and the level of the density signal increases, the weighting coefficient for the current pixel decreases.

18. A method according to claim 13 wherein said look-up table unit selects the weighting coefficient for the current pixel, and operates such that when the level of the contrast signal decreases and the level of the density signal increases, the weighting coefficient for the current pixel decreases.

* * * * *